United States Patent
Su et al.

(10) Patent No.: US 12,489,143 B2
(45) Date of Patent: Dec. 2, 2025

(54) METHOD FOR PRODUCING SOLID-STATE BATTERY

(71) Applicant: Cyntec Co., Ltd., Hsinchu (TW)

(72) Inventors: Chihung Su, Hsinchu (TW); Wenhsiung Liao, Hsinchu (TW)

(73) Assignee: Cyntec Co., Ltd., Hsinchu (TW)

( * ) Notice: Subject to any disclaimer, the term of this patent is extended or adjusted under 35 U.S.C. 154(b) by 0 days.

(21) Appl. No.: 18/428,780

(22) Filed: Jan. 31, 2024

(65) Prior Publication Data
US 2024/0222696 A1  Jul. 4, 2024

Related U.S. Application Data

(62) Division of application No. 16/698,131, filed on Nov. 27, 2019, now Pat. No. 11,929,460.

(51) Int. Cl.
*H01M 10/0562* (2010.01)
*H01M 4/04* (2006.01)
*H01M 50/46* (2021.01)

(52) U.S. Cl.
CPC ..... *H01M 10/0562* (2013.01); *H01M 4/0419* (2013.01); *H01M 50/46* (2021.01)

(58) Field of Classification Search
CPC . H01M 10/0562; H01M 50/46; H01M 4/0419
See application file for complete search history.

(56) References Cited

U.S. PATENT DOCUMENTS

| | | |
|---|---|---|
| 10,854,920 B2 | 12/2020 | Makino et al. |
| 10,950,889 B2 | 3/2021 | Christensen et al. |
| 2007/0015060 A1* | 1/2007 | Klaassen ............. H01M 10/056 429/126 |
| 2015/0171471 A1 | 6/2015 | Haregewoin et al. |
| 2019/0123384 A1 | 4/2019 | Harry et al. |
| 2020/0280091 A1* | 9/2020 | Christensen ............ H01M 4/62 |
| 2020/0403266 A1* | 12/2020 | Hu .................... H01M 10/0585 |
| 2021/0098820 A1 | 4/2021 | Christensen et al. |
| 2021/0367263 A1* | 11/2021 | Lee ................... H01M 10/0525 |

FOREIGN PATENT DOCUMENTS

| | | |
|---|---|---|
| CN | 107851841 A | 3/2018 |
| CN | 108475815 A | 8/2018 |
| WO | 2019121403 A1 | 6/2019 |

OTHER PUBLICATIONS

Tatsuma et al. (Inhibition effects of polyacrylonitrile gel electrolytes on lithium dendrite formation. Journal of Electroanalytical Chemistry. 472 (2). (1999)) (Year: 1999).*

(Continued)

*Primary Examiner* — Brian R Ohara
*Assistant Examiner* — Emily Elizabeth Freeman
(74) *Attorney, Agent, or Firm* — KIRTON McCONKIE; Evan R. Witt

(57) ABSTRACT

A solid-state battery includes a first electrode; a second electrode having a first side facing a first side of the first electrode and spaced from the first electrode; and a solid electrolyte at least partially disposed in a space between the first electrode and the second electrode for providing a path for metal ions associated with the first electrode and/or the second electrode to move through. The metal ions are kept differentially distributed along the path.

14 Claims, 7 Drawing Sheets

(56) References Cited

OTHER PUBLICATIONS

Li, Dan et al., 3D Fiber-Network-Reinforced Bicontinuous Composite Solid Electrolyte for Dendrite-free Lithium Metal Batteries, ACS Applied Materials & Interfaces, 2018, pp. 7069-7078.
Kumar, Jetendra et al., A High Performance Ceramic-Polymer Separator for Lithium Batteries, Electrical and Computer Engineering Faculty Publications, 2016.

* cited by examiner

METHOD FOR PRODUCING SOLID-STATE BATTERY

CROSS-REFERENCE TO RELATED APPLICATIONS

The present application is a divisional application claiming benefit from a parent U.S. patent application bearing a Ser. No. 16/698,131 and filed Nov. 27, 2019. Contents of the parent patent application are incorporated herein for reference.

FIELD OF THE INVENTION

The present invention relates to a method for producing a battery, and more particularly to a method for producing a solid-state battery.

BACKGROUND OF THE INVENTION

Please refer to FIG. 1A and FIG. 1B, which schematically illustrate charging and discharging phases of a conventional lithium-ion battery, respectively, wherein the lithium-ion battery supplies a battery voltage Vb and a battery current Ib, and is electrically connected to an electric supply 98 for charging (FIG. 1A) with electrons e−, and the lithium-ion battery is electrically connected to a load 99 for discharging (FIG. 1B) to release electrons e−. A cathode 91 of the conventional lithium-ion battery is formed of a multi-metal oxide material to which lithium is added, and an anode 92 of the conventional lithium-ion battery is formed of graphite. The cathode 91 and the anode 92 are rinsed in an electrolyte solution 90 and a separator 93 is disposed between the cathode 91 and the anode 92 to keep the two electrodes apart to prevent from electrical short circuits while allowing ionic charge carriers to pass through. In the charging phase, lithium ions 900 move from the cathode 91 to the anode 92 through the separator 93 by way of the electrolyte 90, as indicated by arrows 901. On the other hand, in the discharging phase, lithium ions 900 reversely move from the anode 92 to the cathode 91 through the separator 93 by way of the electrolyte 90, as indicated by arrows 902.

The material of the electrolyte solution used in a battery cell is commonly corrosive and combustible, and due to the liquid feature, leaking might adversely occur. Therefore, such a battery cell might be unsatisfactory in safety and reliability.

Furthermore, with advancement of technology and increasing attention on environmental protection, portable electronic products and electric vehicles have become more and more popular in our daily lives. Therefore, there is a growing demand on development of compact and efficient batteries, which is of a small size but can work long. In view of the fact that the market of lithium-ion batteries worldwide, for example in 2017, has exceeded ten billion US dollars, it means there is still highly demand on further improvement of lithium-ion batteries, particular on enhanced energy density. Therefore, solid-state lithium batteries have been developed.

A solid-state lithium battery is generally composed of a cathode, an anode and an electrolyte, which are all formed of substantially solid material. Varying with the species of electrolytes, currently commercially available solid-state batteries are basically classified into two types, i.e. polymeric solid-state lithium batteries comprising organic polymeric electrolytes and inorganic solid-state lithium batteries comprising inorganic solid electrolytes. The inorganic solid-state lithium batteries may be further classified into oxide solid-state lithium batteries and sulfide solid-state lithium batteries.

Current solid-state lithium batteries, however, still encounter some problems. For example, the ionic conductivity of the solid electrolyte is unsatisfactory at room temperature, and impedance at the interfaces between the solid electrolyte and the anode and cathode electrodes is adversely high. The ionic conductivity of the currently available solid electrolytes, e.g. polymeric solid electrolytes, oxide solid electrolytes and sulfide solid electrolytes, is about $10^{-3} \sim 10^{-5}$ S/cm, which is much less than the conventional liquid electrolyte, which is about $10^{-2}$ S/cm. Therefore, the diffusion rate of lithium ions is not high enough for charging/discharging operations at room temperature. In addition to considerations of ionic conductivity and interface impedance, polymeric solid electrolytes, oxide solid electrolytes and sulfide solid electrolytes further have respective drawbacks. For example, polymeric solid electrolytes have relatively narrow electrochemical windows and relatively low stability; and sulfide solid electrolytes have relatively low material stability. Furthermore, in a solid-state battery, voids are inherently existent in the interfaces between an electrolyte and anode and cathode electrodes, and the internal of the solid electrolyte. The presence of voids would increase resistance and internal resistance of the battery cell. The bigger the battery cell, the larger and more the voids. As such, the size of the battery cell would be redundantly increased. Moreover, since the resistance of conventional solid-state batteries is as high as $100\Omega \sim 200\Omega$, charging/discharging is only applicable to small current, and thus the charging/discharging rate is relatively low.

SUMMARY OF THE INVENTION

Therefore, an object of the present invention is to provide a solid-state battery, which can support charging/discharging at a relatively high rate.

The solid-state battery according to the present invention specifically includes a solid electrolyte, which provides a path for metal ions to move through while keeping the metal ions are kept differentially distributed along the path.

In accordance with another aspect of the present invention, a solid-state battery comprises a first electrode; a second electrode having a first side facing a first side of the first electrode and spaced from the first electrode; and a solid electrolyte at least partially disposed in a space between the first electrode and the second electrode for providing a path for metal ions associated with the first electrode and/or the second electrode to move through, wherein the metal ions are kept differentially distributed along the path.

In an embodiment, the first portion of the solid electrolyte is a metastable solid-like polymer electrolyte, and the second portion is an artificial function solid electrolyte.

In another embodiment, the solid electrolyte further includes a third portion, which covers at least the first electrode, while the second portion covers at least the second electrode, and the first portion is at least partially disposed between the second portion and the third portion. A concentration of the metal ions in each of the second portion and the third portion is made higher than in the first portion.

In another embodiment, the third portion of the solid electrolyte surrounds the first electrode, the second portion of the solid electrolyte surrounds the second electrode, and the first portion surrounds the second portion and the third portion.

According to another aspect of the present invention, a method for producing a solid-state battery comprises: providing a first electrode and a second electrode, which are isolated from each other while a first side of the first electrode and a first side of the second electrode face each other; providing a second solid electrolyte at least in a space between the first electrode and the second electrode; and providing a first solid electrolyte covering at least the second solid electrolyte in the space between the first solid electrolyte and the second electrode. The first solid electrolyte and the second solid electrolyte cooperatively provide a path for metal ions associated with the first electrode and/or the second electrode to move through, and a concentration of the metal ions in the second solid electrolyte is made higher than that in the first solid electrolyte.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
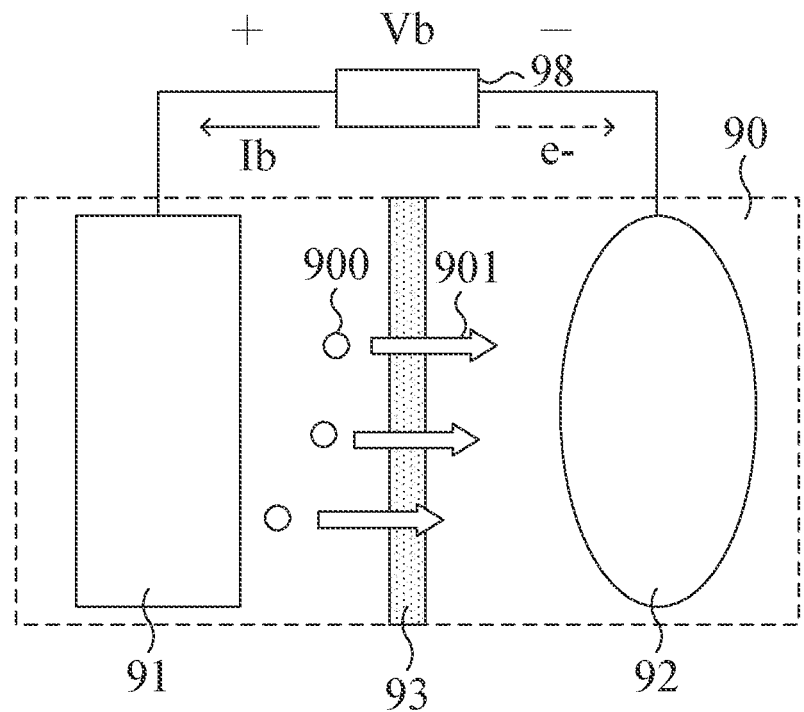
FIG. 1A is a scheme illustrating a charging phase of a conventional lithium-ion battery.
Figure 1B:
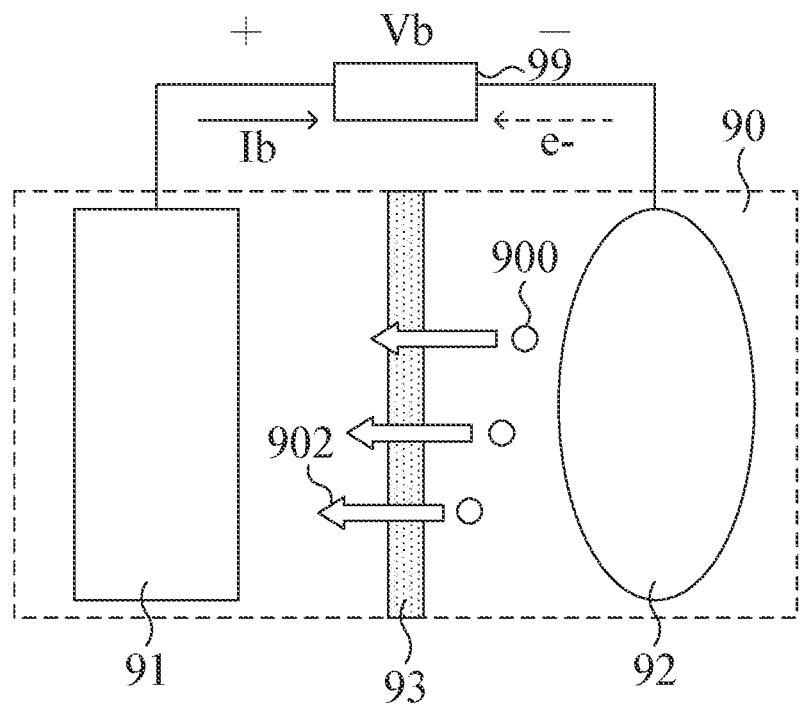
FIG. 1B is a scheme illustrating a discharging phase of a conventional lithium-ion battery.
Figure 2A:
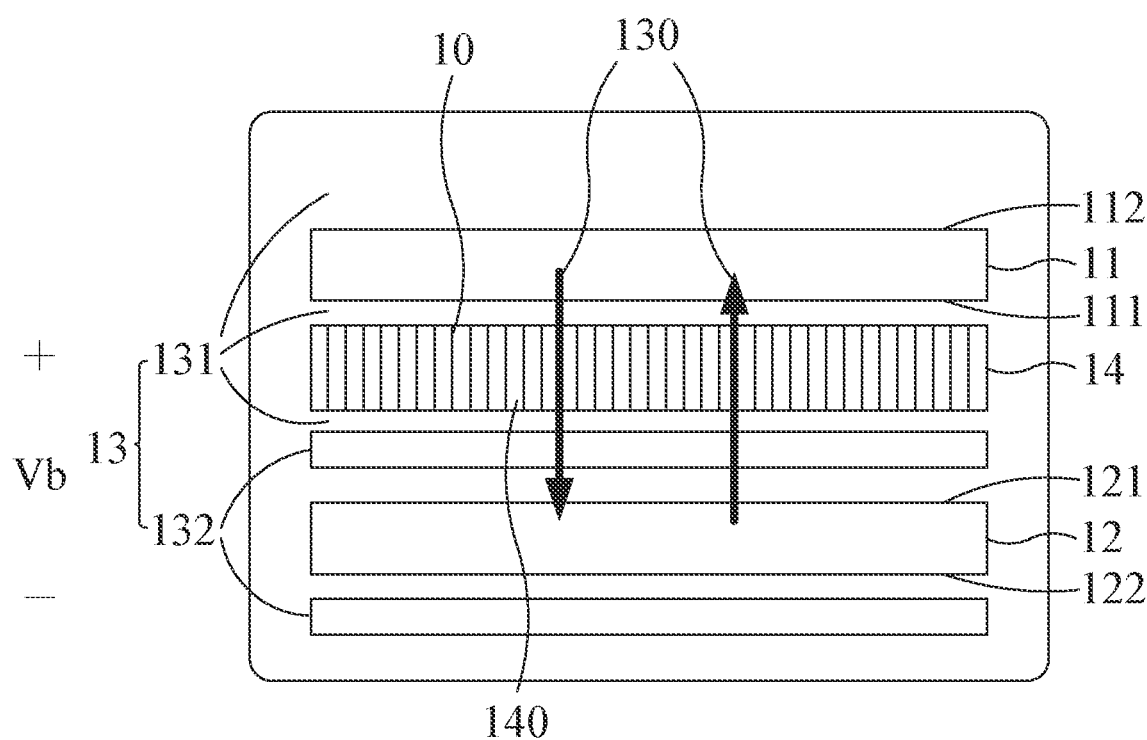
FIG. 2A is a schematic diagram illustrating a solid-state battery according to an embodiment of the present invention.

A solid-state battery according to an embodiment of the present invention is illustrated in FIG. 2A. The solid-state battery supplies a battery voltage Vb, and includes a first electrode 11, a second electrode 12 and a solid electrolyte 13. The second electrode 12 is disposed opposite to the first electrode 11 and spaced from the first electrode 11. The solid electrolyte is at least partially disposed in a space 10 between the first electrode 11 and the second electrode 12 for providing a path 130 for metal ions associated with the first electrode 11 and/or the second electrode 12 to move through. Preferably but unnecessarily, the space 10 as shown in FIG. 2A is disposed between inner sides 111 and 121 of the first electrode 11 and the second electrode 12. Alternatively, the space 10 may alternatively disposed between an outer side 112 of the first electrode 11 and an outer side 122 of the second electrode 12, or in another configuration, as long as metal-ion transmission between the first electrode 11 and the second electrode 12 can be successfully conducted.

According to the present invention, the metal ions are kept differentially distributed along the path 130. For example, the solid electrolyte 13 is defined with a first portion 131 covering at least the first electrode, and a second portion 132 covering at least the second electrode, wherein a concentration of the metal ions in the second portion 132 is made higher than in the first portion 131. Therefore, there would be a concentration gradient of the metal ions at the interface of first portion 131 and the second portion 132 along the path 130. In the embodiment as illustrated in FIG. 2A, the second portion 132 is a high concentration layer of the metal ions. By disposing the second portion 132 around one or more of the electrodes 11 and 12, diffusion of the metal ions can be effectively conducted within a relatively short distance as the concentration gradient is proportional to mass per unit area per unit time according to Fick's law. Meanwhile, fast charging can be effectively achieved.

The solid-state battery further includes a separator 14, which is made of an insulative material and disposed between the first electrode 11 and the second electrode 12 to keep the two electrodes apart so as to prevent from electrical short circuits, and meanwhile, the separator 14 has tiny holes 140 for the metal ions to pass through. In some other embodiments, such a separator may be omitted for cost and/or size considerations.

Hereinafter, an example is given for better understanding the above embodiment. In this example, the battery is a lithium ion battery, the first electrode 11 is a cathode and the second electrode 12 is an anode. The first electrode 11 is formed of a composite material, which includes an active material, a conductor, a binder, and particles of inorganic solid electrolyte for ordinary lithium batteries. The anode active material, for example, may be metallic lithium, lithium alloy, hard carbon, soft carbon, fullerene, $SiO_2$, Si/C, $TiO_2$ or $SnO_2$. As the conductor, graphene, carbon nanotubes, Ketjenblack, activated carbon or vapor-grown carbon fiber (VGCF) may be used, and of course, two or more of them may be used in the form of a mixed conductor. The binder may be selected from the group consisting of polytetrafluoroethylene (PTFE), polyvinylidene fluoride (PVDF), carboxymethyl cellulose (CMC), styrene-butadiene rubber (SBR), and polyimide, or a mixture thereof. The second electrode structure 12 is also formed of a composite material including an active material, a conductor, a binder, and particles of inorganic solid electrolyte for ordinary lithium batteries. The cathode active material, for example, may be a lithium cobalt composite oxide, a lithium nickel composite oxide, a lithium manganese composite oxide, a lithium vanadium composite oxide or a lithium iron composite oxide. Likewise, graphene, carbon nanotubes, Ketjenblack, activated carbon or vapor-grown carbon fiber (VGCF) may be used as the conductor, and of course, two or more of them may be used in the form of a mixed conductor. The binder may include a material selected from the group consisting of polytetrafluoroethylene (PTFE), polyvinylidene fluoride (PVDF), carboxymethyl cellulose (CMC), styrene-butadiene rubber (SBR), and polyimide, or a mixture thereof. It is to be noted that the above compounds are listed for exemplification only, and in other examples, the first electrode 11 may be an anode, the second electrode may be a cathode, and similar or different compounds suitable for operations of batteries may be used.

As described above, the solid electrolyte 13 is disposed in the space 10 between the first electrode structure 11 and the second electrode structure 12, and provides the moving path 130 of the metal ions, e.g. lithium ions. The first portion 131 of the solid electrolyte 13 is a metastable solid-like polymer electrolyte (MSPE), and the second portion 132 is an artificial function solid electrolyte (AFSE). For forming the MSPE, a lithium salt, e.g. $LiPF_6$, is first dissolved in an organic solvent to prepare a nonaqueous solution containing 1 mol/L of $LiPF_6$. In addition to $LiPF_6$, other lithium salts such as $LiClO_4$, $LiBF_4$, and $LiN(SO_2)$ and lithium bistrifluoromethylsulfonimide (LiTFSI) may also be used. The organic solvent, for example, may be ethylene carbonate, propylene carbonate, dimethoxyethane, dimethyl carbonate, ethyl methyl carbonate, diethyl carbonate, or a combination thereof. The non-aqueous solution of the lithium salt, e.g. 50-99 wt %, is then mixed with a metastable polymer, e.g. 1-50 wt %, which is produced in a first-stage reaction at a low temperature, e.g. preferably lower than 50° ° C., and has a small molecular weight, in a mixer. For example, the resulting mixture contains 1-2M lithium salt and includes the non-aqueous solution of the lithium salt and the metastable polymer at a weight ratio of 90%:10%, and the mixture is preferably stored at a low temperature to remain in a fluid state. The fluid state is advantageous for subsequent manufacturing process of the lithium ion battery. On the other hand, the metastable polymer is selected to have reactive functional groups, which allow a second-stage reaction to be conducted after the fluid is infused into the space between electrodes of the battery, and then an appropriate temperature, e.g. preferably ranged between 70° C. and 85° C., or voltage is applied. It is understood by those skilled in the art that the two stages of reactions for producing the metastable nitrogen-containing polymer is advantageous due to a significant difference in respective reaction rates. It is preferable that the metastable polymer is hyperbranched so that terminal groups of the hyperbranched metastable polymer can react effectively with ion-conductive groups, e.g. an oxygen atom containing a lone pair in a polyether segment, in the second-stage reaction to result in a cross-linking moiety, thereby producing a network/chain-configured solid polymeric electrolyte. For example, the metastable polymer may be made of a soft metastable polymeric material, which is selected from polyacrylonitrile (PAN), poly Methyl methacrylate (PMMA) and metastable nitrogen-containing polymer. The nitrogen-containing polymer is formed by reacting a compound A with a compound B, wherein the compound A may be maleimide, and compound B may be imidazole, imidazole derivative, pyrrole, pyrrole derivative, pyridine, 4-tert-butylpyridinium, 3-butylpyridine, 4-dimethylaminopyridine, 2,4,6-triamino-1,3,5-triazine, 2,4-dimethyl-2-imidazoline, pyridazine, pyrimidine, pyrazine or a combination thereof. For example, the weight ratio of PAN, PMMA or the metastable polymer may be 1-50 wt %, and the weight ration of the lithium-containing component such as lithium salt and other mixtures such as solvents may be 50-99 wt %. Preferably, the weight ratio of PAN, PMMA or the metastable polymer may be 5-10 wt %, and the weight ration of the lithium-containing component such as lithium salt and optionally other mixtures such as solvents may be 90-95 wt %.

The resulting structure is stable and capable of retaining the electrolyte solution with minimized leaking problem. Moreover, due to the initially fluid feature, the metastable polymer, after being infused, can be evenly distributed at interfaces between heterogeneous materials, e.g. electrodes, separator, particles, etc., as well as voids. Accordingly, interface impedance can be reduced.

For producing the AFSE, inorganic lithium superconductor ceramic powders and a semi-crystalline polymer are mixed at a weight ratio of 80:20. For example, the semi-crystalline polymer is first dissolved in a solvent having a low boiling point, e.g. ethanol, then a viscosity of the resulting solution is adjusted, and then the lithium superconductor ceramic powders are added and uniformly dispersed in the resulting solution. The solution containing a mixture of the inorganic lithium superconductor ceramic powders and the semi-crystalline polymer are sprayed or applied with a film scraper to form a wet film, and then baked to evaporate the solvent, thereby producing the AFSE film. Since the second portion 132 contains lithium superconductor ceramic powders, it is understood that the second portion 132 has a concentration of lithium ions higher than the first portion 131. For example, it is at least three times higher and preferably 3-5 times higher. Therefore, a concentration gradient of lithium ions can be desirably rendered at the interface of the first portion 131 and the second portion 132 along the path 130, as described above.

The separator 14 is made of a porous polymer, which is, for example, a polypropylene (PP)-based film or a polyethylene (PE)-based film or a combined PP/PE-based film. The separator 14 has a thickness of less than 25 μm, and preferably but not necessarily has a curvature large enough for satisfactory compressibility. The electrolyte preferably but not necessarily exhibits wettability.

In the above embodiment as illustrated in FIG. 2A, the second portion 132 of electrolyte 13 having a higher concentration of metal ions is disposed around the anode 12. Alternatively, the second portion 132 of the electrolyte 13 having a higher concentration of metal ions can be disposed around the cathode instead of the anode 12.

Figure 2B:
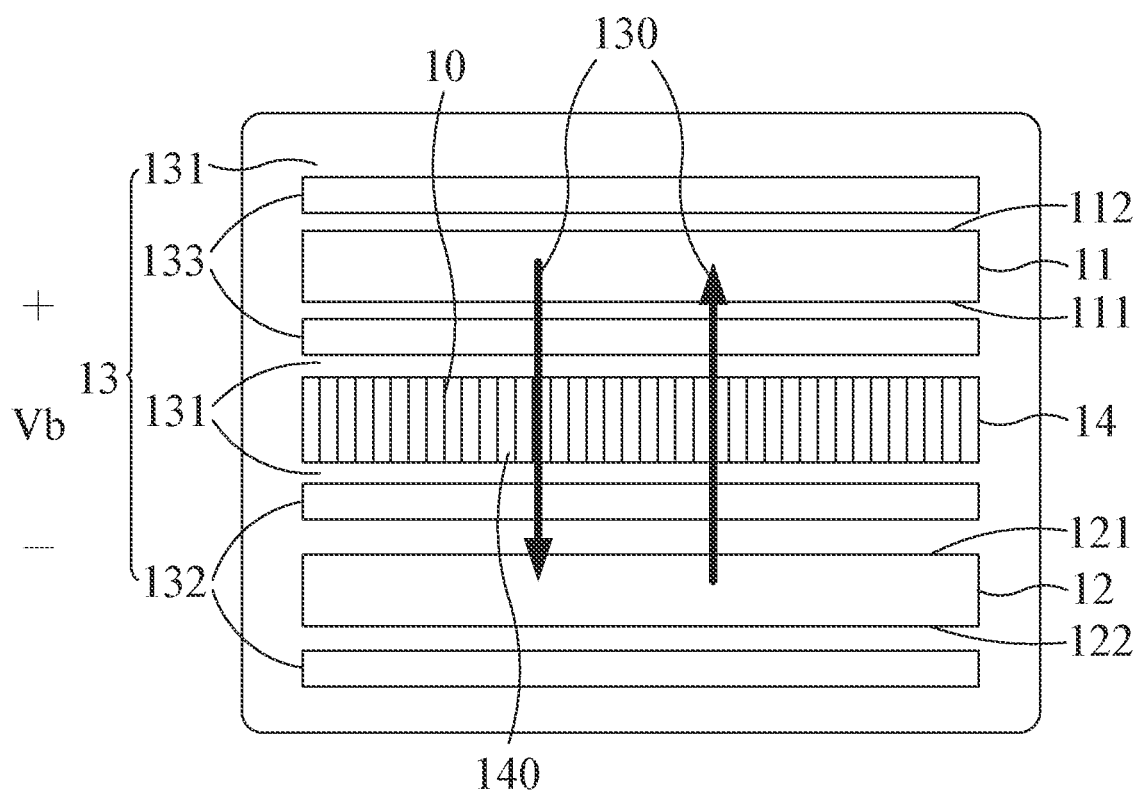
FIG. 2B is a schematic diagram illustrating a solid-state battery according to another embodiment of the present invention.

Please refer to FIG. 2B, in which a solid-state battery according to another embodiment of the present invention is schematically illustrated. The solid-state battery is similar to that shown in FIG. 2A except that the electrolyte 13 further includes a third portion 133 covering the first electrode 11, i.e. the cathode. In this embodiment, the first portion 131 surrounds the cathode 11, anode 12, second and third portions 132 and 133 of the electrolyte 13. In this embodiment, each of the second portion 132 and the third portion 133 has a higher concentration of metal ions than the first portion 131. Similar to the discussions applied to the embodiment as illustrated in FIG. 2A, since the third portion 133 has a higher concentration of metal ions than the first portion 131, a concentration gradient of the metal ions would be rendered at the interface therebetween along the moving path 130 of the metal ions. The concentration gradient of the metal ions would facilitate diffusion of the metal ions, and thus improve the charging performance of the battery. In some extensive embodiments, the second portion 132 may be disposed on a part or the entirety of the first electrode 11 and/or the second electrode 12 to have the metal ions distributed as gradient along the moving path 130 for improved charging/discharging performance. In other embodiments, the first portion 131 may be disposed on a part or the entirety of the first electrode 11 and/or the second electrode 12 in addition to the second portion 132 and the third portion 133 to have the metal ions distributed as gradient along the moving path 130 for improved charging/discharging performance. In further embodiments, there are more than one first electrode 11 and/or second electrode 12 electrically connected in series or in parallel to further promote the battery voltage Vb and the battery current Ib. The first electrode 11, the second electrode 12, the electrolyte 13 and the separator 14 are accommodated in a housing of the battery, and the first and second electrodes 11 and 12 may include portions extending outside the housing.

On the other hand, the artificial functional solid electrolyte (AFSE) contains inorganic lithium superconductor ceramic powders and a semi-crystalline polymer and thus has a high lithium ion concentration. The AFSE further functions to reduce the discharging heat occurring at the cathode electrode once the battery is short-circuited. The surface of the AFSE is rough and porous for trapping and retaining the lithium salt of the first portion 131. Therefore, the soft metastable polymer mentioned above can be trapped and adsorbed evenly on the surface of the AFSE, thereby reducing the interface impedance. As known, lithium superconductor ceramic powders can provide a relatively high concentration of lithium ions, and meanwhile, the conduction rate of lithium ions would be relatively high, e.g. 1 mS/cm$^2$. With low impedance and high conduction rate, diffusion can be efficiently conducted so that fast charging capability (high charging current) can be promoted. Such an AFSE is not only strong but also flexible, so it can accommodate changes in anode volume during charging and discharging without breaking or failing. Meanwhile, the anode material, for example, may include a mixture of silicon dioxide and graphite.

The lithium superconductor ceramic powders used in the AFSE, for example, may be selected from a NaSICON structure, a Garnet structure or a Perovskite structure, e.g. La0.51Li0.34TiO2.94 (LLTO), Li7La3Zr2O12 (LLZO), Li1.3Al0.3Ti1.7 (PO4) selected from the group consisting of. 3(LATP), Li2+2xZn1−xGeO4(LISICON), Li2S, Li2S—P2S5, Li2S—SiS2, Li2S—GeS2, Li2S—B2S5, Li2S—Al2S5, Li3.25Ge0.25P0.75S4 (Thio-LISCON), Li3N, Li3+yPO4−xNx (LIPON) or a combination thereof. The semi-crystalline polymer is a rigid polymer having a crystallization rate between 10% and 80%, and may be selected from a group consisting of polyvinylidene fluoride (PVDF) and Poly(vinylidene fluoride-hexafluoropropylene (PVDF-HFP), Poly(propylene carbonate) (PPC), polyethylene oxide (PEO), polyethylene (PE), polyethylene terephthalate (PET), tetraethylene glycol diacrylate, polyethylene glycol Acrylate (PEGDA), trimethylolpropane triacrylate, polytetrafluoroethylene (PTFE), polypropylene (PP), or the like. The lithium superconductor ceramic powders and the semi-crystalline polymer may be mixed at a ratio of about 50 wt % to 90 wt % to about 10 wt % to 50 wt % in a mixer. In this way, the AFSE used in the present invention can be produced. Subsequently, the product is optionally dried in a drying room.

Figure 3A:
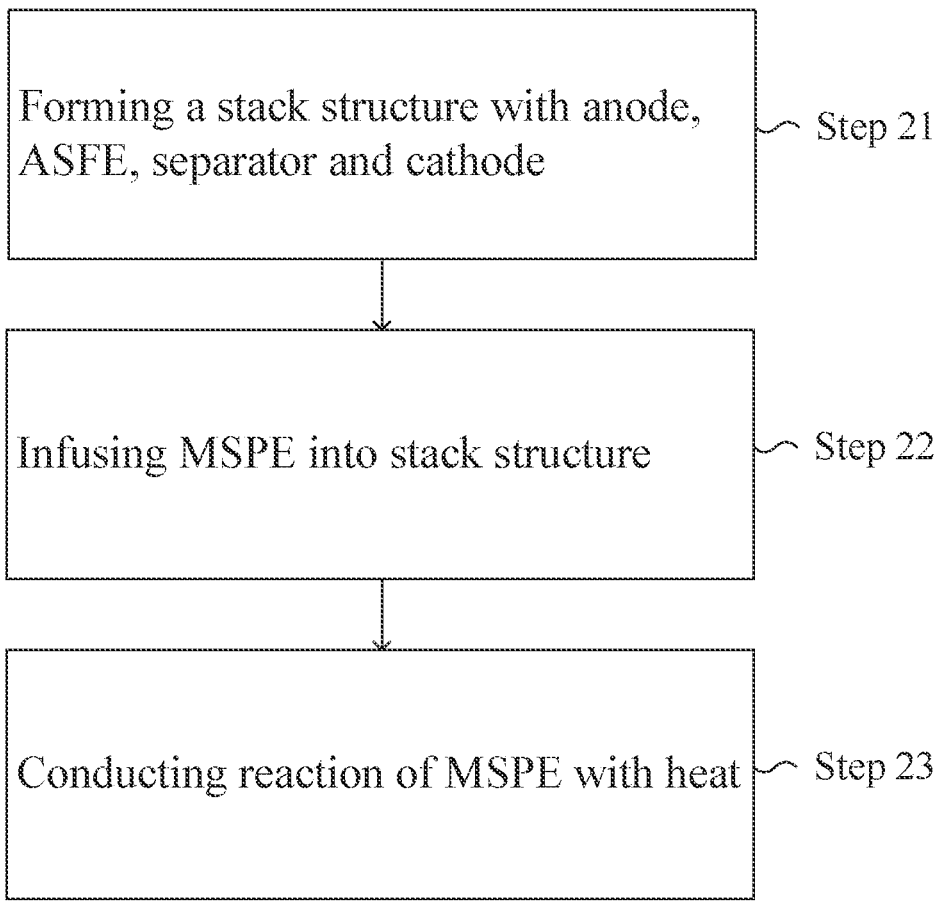
FIG. 3A is a flowchart illustrating a method for producing a solid-state battery according to an embodiment of the present invention.

Please refer to FIG. 3A, which is a flowchart illustrating essential steps of a method for producing the solid-state battery of FIG. 2A according to the present invention. First of all, a stack structure with sequentially allocated anode 12, ASFE layer 132, separator 14 and cathode 11 is formed (Step 21). Then a mixture of the non-aqueous solution of the lithium salt with the metastable polymer, i.e. the product of the first-stage reaction, is infused into the stack structure, fills the voids in the stack structure, and rinses all the interfaces so as to reduce interface impedance and inner resistance (Step 22). Subsequently, the second-stage reaction, i.e. cross-linking, is conducted on a proper condition to produce the solid MSPE retained with a nonaqueous solvent (Step 23). In an alternative embodiment, the ASFE may be previously applied to the cathode and/or anode by way of wet-coating, spraying, electrospinning or dipping with a thickness of 0.2. μm-10 μm before being stacked. The ASFE layer 132 may be disposed at either the cathode or the anode, and is preferred to be disposed at the anode.

Figure 3B:
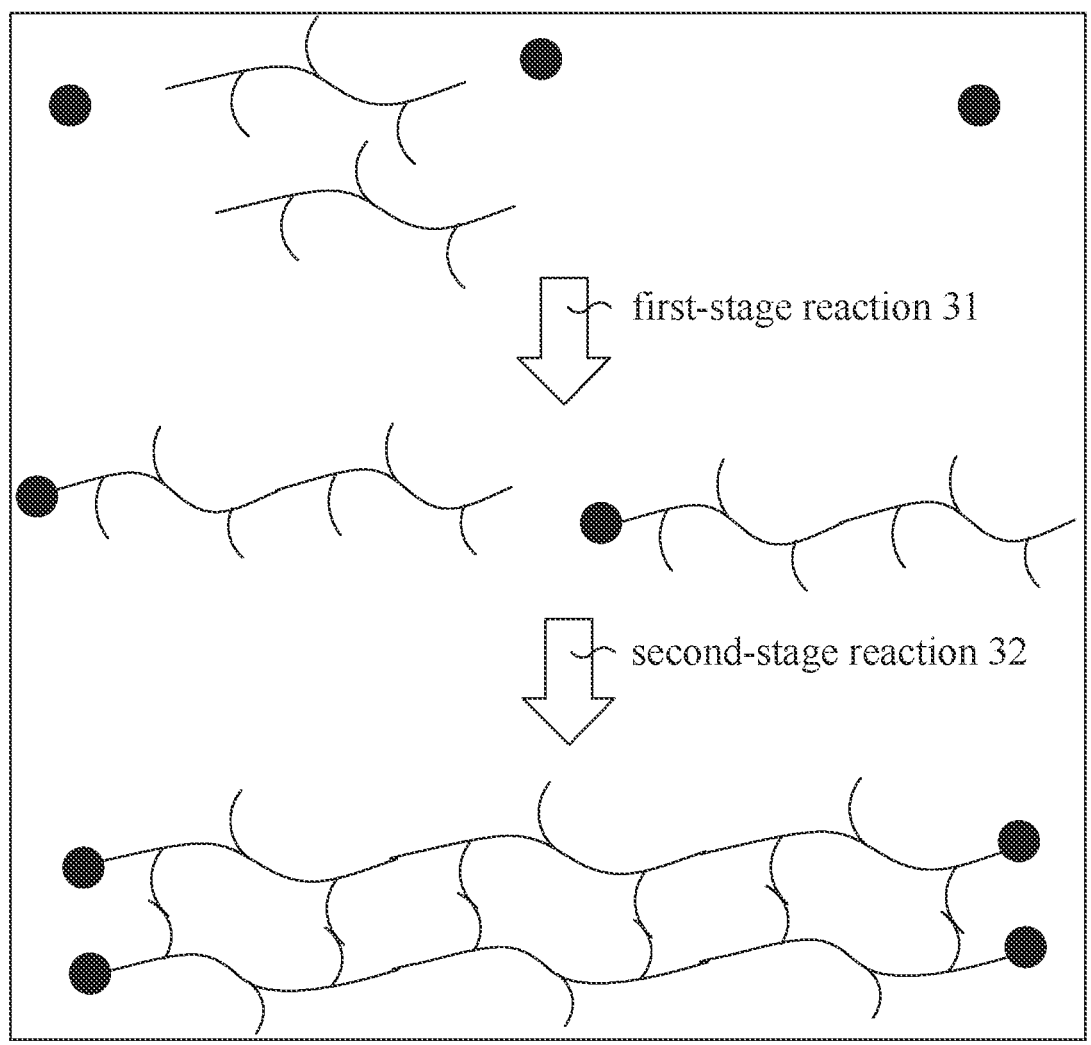
FIG. 3B is a scheme illustrating a manufacturing process of the MSPE according to an embodiment of the present invention.
Figure 4A:
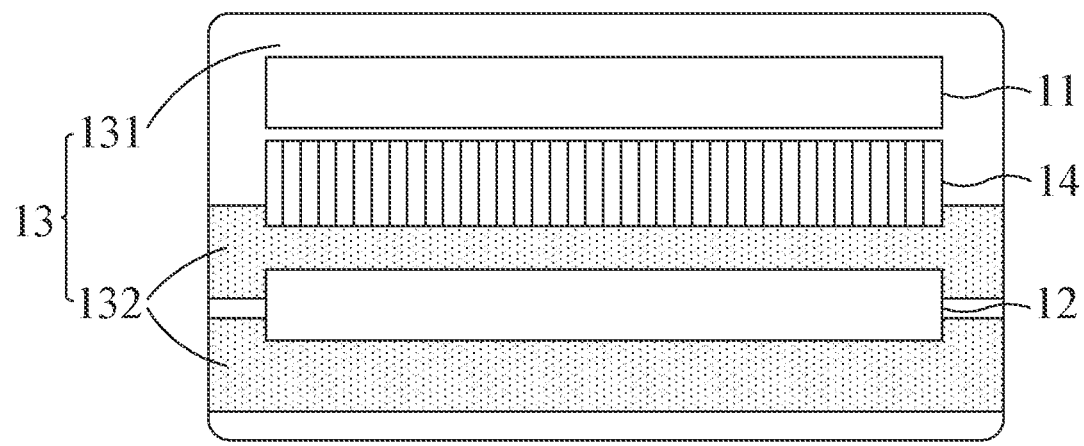
FIG. 4A is a schematic diagram illustrating a solid-state battery produced according to an embodiment of the present method.
Figure 4B:
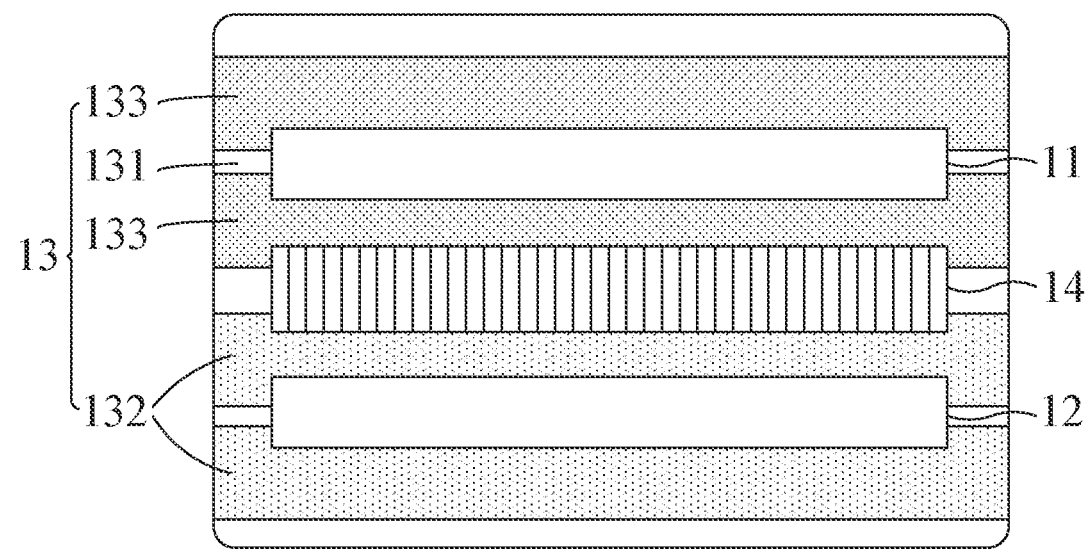
FIG. 4B is a schematic diagram illustrating a solid-state battery produced according to another embodiment of the present method.

FIG. 3B schematically illustrates a manufacturing process of the MSPE according to an embodiment of the present invention. As described above and illustrated in FIG. 3B, the first-stage reaction 31 for producing the soft metastable polymer having a smaller molecular weight, and then the second-stage reaction 32 for producing the solid MSPE having a network/chain structure are performed after the soft metastable polymer together with the non-aqueous lithium salt solution are applied to the stack structure. After the MSPE is integrated with the stack structure, common steps such as aging, degassing and charging/discharging are performed to complete the solid-state battery cell, as illustrated in FIG. 4A and FIG. 4B. As shown, the portion 131 of the electrode 13 may cover the entirety of the second portion 132, the third portion 133 and the separator 14, if any, and the second portion 132 may cover the entirety of the second electrode 12. Alternatively, the first electrode 11, the second electrode 12, the solid electrolyte 13, the separator 14, the first portion 131, the second portion 132 and the third portion 133 may interleave one another provided that the metal ions are distributed as gradient along the moving path 130 for improved charging/discharging performance, in which the first electrode 11 and/or the second electrode 12 are covered with the portion 132 and/or 133 of the electrode 13, which has a higher concentration of metal ions than the portion 131 of the electrode 13.

Figure 5:
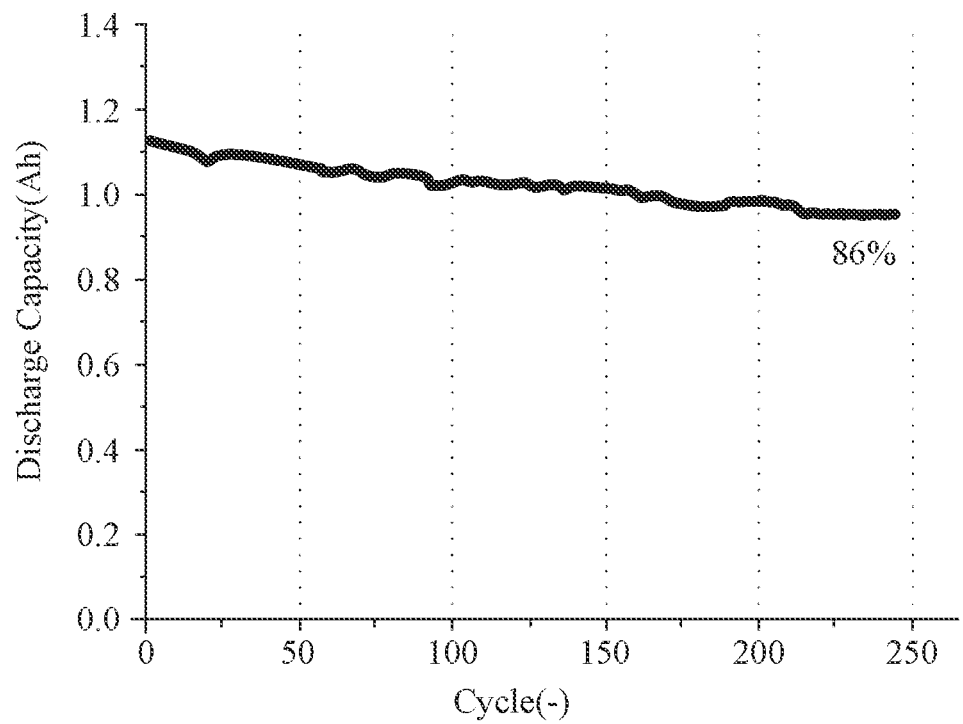
FIG. 5 is a plot schematically illustrating variation of a discharge capacity with cycles on a specified test.
Figure 6:
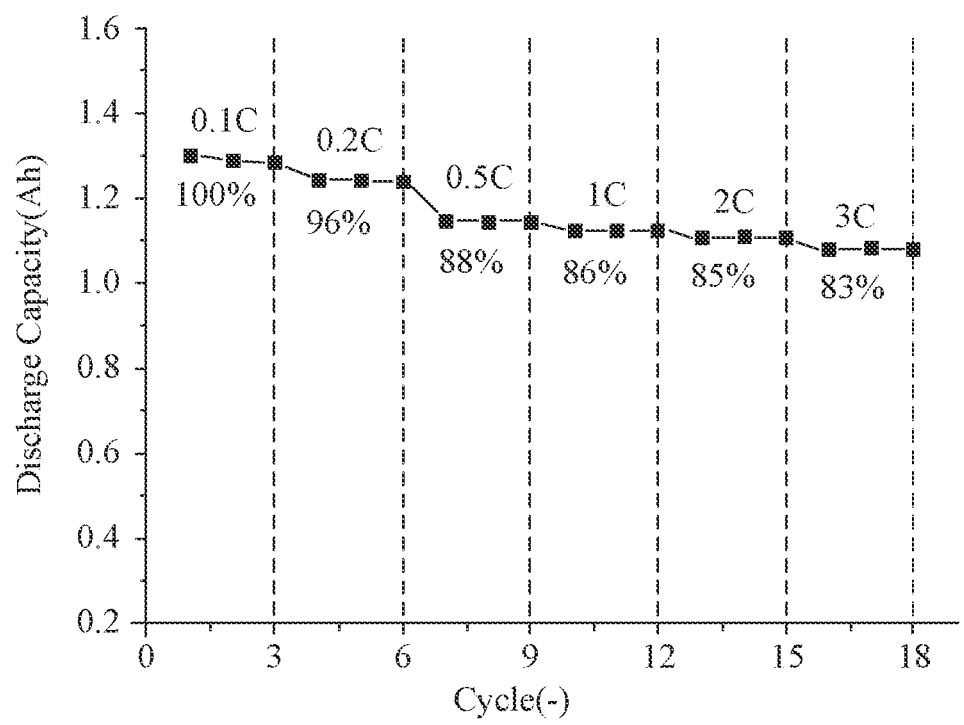
FIG. 6 is a plot schematically illustrating variation of a discharge capacity with cycles on another test.

Afterwards, the performance of the solid-state battery produced according to the present invention is tested. First of all, install the solid-state battery in an electrochemical device. The internal impedance of the present battery with a concentration gradient of metal ions and a conventional battery without a concentration gradient of metal ions are tested at a temperature of 25° C. The present battery has a reduced resistance, e.g. less than 38 mΩ, while the conventional battery has a resistance of 62 mΩ. It can thus be concluded that the concentration gradient of metal ions in the electrolyte contributes to reducing internal voids and reducing internal impedance of the battery. A current is applied to perform charging until the battery voltage Vb reaches 4.2V and then discharging is performed until the battery voltage Vb reaches 3V. In the charging/discharging cycle test, the battery is charged/discharged for 240 cycles with a low rated current density of 0.75 A/cm$^2$, and the cycle performance is evaluated. For the present battery, the discharging electric capacity or electrical energy storage capacity of the 240th cycle is still maintained at about 86% of the rated electrical energy storage capacity (see FIG. 5). In the fast charging test, the high rated current density is set to be 1.5 A/cm$^2$, the charging and discharging current densities 0.1 C, 0.2 C, 0.5 C, 1 C, 2 C and 3 C indicate 0.15 A/cm$^2$, 0.3 A/cm$^2$, 0.75 A/cm$^2$, 1.5 A/cm$^2$, 3 A/cm$^2$ and 4.5 A/cm$^2$, respectively. Three cycles of alternate charging and discharging are performed with these six kinds of current densities in sequence of ascending current densities. The experimental results, as illustrated in FIG. 6, show that the corresponding discharging electric capacity or electrical energy storage capacity are 100%, 96%, 88%, 86%, 85% and 83% of the rated electrical energy storage capacity, respectively. It is apparent that the batter according to the present invention has only small decay even if on large-current conditions.

As described above, the solid-state battery having a concentration gradient has significantly improved battery performance and reliability. Moreover, the solid-state battery has advantages of high safety, high energy density, and good long-term storage and high temperature adaptability. The solid-state battery is particularly adapted to be used for fast charging.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for producing a solid-state battery, comprising:
   providing a first electrode and a second electrode, wherein the first electrode is a cathode, the second electrode is an anode, and the second electrode has a first side facing a first side of the first electrode and spaced from the first electrode;
   providing a second solid electrolyte at least in a space between the first electrode and the second electrode; and
   providing a first solid electrolyte being in contact with at least the second solid electrolyte in the space between the first electrode and the second electrode;
   wherein the first solid electrolyte and the second solid electrolyte both contain a metal salt and cooperatively provide a path for metal ions associated with the first electrode and/or the second electrode to move through, and a concentration of the metal ions in the second solid electrolyte is at least three times of that in the first solid electrolyte.

2. The method according to claim 1, further comprising:
   providing a separator in the space between the first side of the first electrode and the first side of the second electrode for isolating the first electrode from the second electrode,
   wherein the separator has a plurality of mini-holes for the metal ions to move through the path.

3. The method according to claim 2, wherein the second solid electrolyte is disposed around the second electrode, and the first solid electrolyte is disposed around the first electrode and the second solid electrolyte.

4. The method according to claim 3, wherein the first solid electrolyte and the second solid electrolyte are provided by:
   applying a mixture of an inorganic lithium superconductor ceramic powder and a semi-crystalline polymer to the second electrode to produce an artificial function solid electrolyte as the second solid electrolyte; and
   applying a non-aqueous solution of a lithium salt and a metastable polymer to the first electrode and the second electrode with the second solid electrolyte in a relatively low temperature, and then heating the resulting structure to conduct a cross-linking reaction in the non-aqueous solution, thereby producing a metastable solid-like polymer electrolyte as the first solid electrolyte.

5. The method according to claim 4, wherein the lithium salt and the metastable polymer in the metastable solid-like polymer electrolyte is in a weight ratio of 90% to 10%, and the inorganic lithium superconductor ceramic powder and the semi-crystalline polymer in the artificial function solid electrolyte is in a weight ratio of 80% to 20%.

6. The method according to claim 4, wherein the mixture of the inorganic lithium superconductor ceramic powder and the semi-crystalline polymer is applied to the second electrode by way of wet-coating, spraying, electrospinning, and/or rinsing to have a thickness ranged between 0.2 μm and 10 μm.

7. The method according to claim 4, wherein the mixture of the inorganic lithium superconductor ceramic powder and the semi-crystalline polymer is applied to the second electrode by:
   dissolving the semi-crystalline polymer in a solvent to form an intermediate solution;
   adjusting a viscosity of the intermediate solution;
   dispersing the inorganic lithium superconductor ceramic powder in the intermediate solution to form a mixture of the inorganic lithium superconductor ceramic powder and the semi-crystalline polymer in the solvent;
   applying the mixture in the solvent to the second electrode; and
   heating the resulting structure to evaporate the solvent.

8. The method according to claim 1, further comprising:
   providing a third solid electrolyte at least in a space between the first electrode and the first solid electrolyte,
   wherein the first solid electrolyte, the second solid electrolyte and the third solid electrolyte cooperatively provide a path for metal ions associated with the first electrode and/or the second electrode to move through, and a concentration of the metal ions in the third solid electrolyte is made higher than that in the first solid electrolyte.

9. The method according to claim 8, wherein the third solid electrolyte is disposed around the first electrode, the second solid electrolyte is disposed around the second electrode, and the first solid electrolyte is disposed around the second solid electrolyte and the third solid electrolyte.

10. The method according to claim 9, wherein the first solid electrolyte, the second solid electrolyte and the third solid electrolyte are provided by:
    applying a mixture of an inorganic lithium superconductor ceramic powder and a semi-crystalline polymer to the first electrode to produce an artificial function solid electrolyte as the third solid electrolyte;
    applying a mixture of an inorganic lithium superconductor ceramic powder and a semi-crystalline polymer to the second electrode to produce an artificial function solid electrolyte as the second solid electrolyte; and
    applying a non-aqueous solution of a lithium salt and a metastable polymer to the first electrode with the third solid electrolyte and the second electrode with the second solid electrolyte in a relatively low temperature, and then heating the resulting structure to conduct a cross-linking reaction in the non-aqueous solution, thereby producing a metastable solid-like polymer electrolyte as the first solid electrolyte.

11. The method according to claim 10, wherein the lithium salt and the metastable polymer in the metastable solid-like polymer electrolyte is in a weight ratio of 90% to 10%, and the inorganic lithium superconductor ceramic powder and the semi-crystalline polymer in the artificial function solid electrolyte is in a weight ratio of 80% to 20%.

12. The method according to claim 1, further comprising:
infusing a non-aqueous solution of a metal salt and a metastable polymer into a stack structure including the first electrode, the second solid electrolyte and the second electrode; and
performing a cross-linking reaction by heating the non-aqueous solution of the metal salt and the metastable polymer to form the first solid electrolyte.

13. The method according to claim 1, wherein the first solid electrolyte is in contact with at least the first electrode, and the second solid electrolyte covers or is in contact with at least the second electrode.

14. The method according to claim 1, further comprising:
forming a stack structure including the first electrode, the second solid electrolyte and the second electrode;
infusing a non-aqueous solution of a metal salt and a metastable polymer into the stack structure; and
performing a cross-linking reaction by heating the non-aqueous solution of the metal salt and the metastable polymer, thereby providing a first solid electrolyte being in contact with the second solid electrolyte in the space between the first electrode and the second electrode.

* * * * *